United States Patent [19]
Nuckolls et al.

[11] Patent Number: 5,955,843
[45] Date of Patent: Sep. 21, 1999

[54] RELAY CIRCUIT FOR PROVIDING POWER FROM A NORMAL OR EMERGENCY POWER SUPPLY TO IGNITE AND DRIVE A HIGH INTENSITY DISCHARGE LAMP

[75] Inventors: Joseph A. Nuckolls, Etowah, N.C.; Isaac L. Flory, IV, Blacksburg, Va.

[73] Assignee: Hubbell Incorporated, Orange, Conn.

[21] Appl. No.: 08/880,311

[22] Filed: Jun. 24, 1997

[51] Int. Cl.$^6$ .................................................. H05B 37/00
[52] U.S. Cl. .............................. 315/86; 315/160; 307/64
[58] Field of Search ................................ 315/86, 87, 76, 315/160, 170, 171, 172, 173–176; 307/64, 65, 11, 18, 19–23, 43, 112, 116, 125, 130, 132 R, 132 E, 66

[56] References Cited

U.S. PATENT DOCUMENTS

| | | | |
|---|---|---|---|
| 2,997,631 | 8/1961 | Moakler | 307/64 |
| 3,808,451 | 4/1974 | Pittet | 307/64 |
| 3,904,920 | 9/1975 | Griffith | 315/78 |
| 4,057,750 | 11/1977 | Elms et al. | 315/86 |
| 4,686,379 | 8/1987 | Ohnari | 307/66 |
| 4,686,424 | 8/1987 | Nuckolls et al. | 315/86 |
| 4,890,041 | 12/1989 | Nuckolls et al. | 315/225 |
| 5,047,694 | 9/1991 | Nuckolls et al. | 315/290 |

FOREIGN PATENT DOCUMENTS 349188  3/1991  Japan.

Primary Examiner—Don Wong
Assistant Examiner—David H. Vu
Attorney, Agent, or Firm—Jerry M. Presson; Joseph J. Buczynski

[57] ABSTRACT

An apparatus and method for supplying emergency power to a lighting device, in particular, an HID lamp, when a failure occurs in a main power supply. The apparatus can include a rectifier circuit for converting an AC voltage signal provided by the main power supply to a DC voltage signal. A capacitive element can be coupled across the DC output terminals of the rectifier circuit and across a DC coil of a DC relay circuit. The amount of energy stored by the capacitor controls the DC relay to provide the voltage of the main power supply to the lamp circuit under normal conditions, and the voltage of an emergency power supply to the lamp circuit when the voltage of the main power supply falls below a predetermined level. Alternatively, an AC relay can be coupled directly to the main AC voltage power supply or emergency power supply and configured to perform a similar operation.

27 Claims, 8 Drawing Sheets

RELAY CIRCUIT FOR PROVIDING POWER FROM A NORMAL OR EMERGENCY POWER SUPPLY TO IGNITE AND DRIVE A HIGH INTENSITY DISCHARGE LAMP

BACKGROUND OF THE INVENTION

1. Field of the Invention

An apparatus and method for alternately coupling a normal power supply and an emergency power supply to a lighting device. More specifically, the present invention relates to an apparatus and method which uses a DC relay to apply an emergency voltage to a lighting device when a normal voltage falls below a predetermined level.

2. Description of the Related Art

Many businesses and establishments will employ an emergency power supply which can be relied upon when the normal power supply malfunctions. Typically, an emergency power supply is used to supply power to lights in the event that a failure occurs in the normal power supply.

Different types of lighting devices, such as fluorescent and incandescent lights, are used in establishments throughout the world. Other types of high intensity lights, commonly known as high intensity discharge lamps (HID lamps), are used in areas requiring much light, such as in stadiums, parking lots and the like.

Due to the nature in which these types of high intensity lights are used, it is critical that the lamps can be quickly restarted after being shut off intentionally or, for example, due to a power failure. Hence, lamp starting circuits, such as those described in U.S. Pat. Nos. 5,047,694 and 4,890,041 to Nuckolls et al., have been developed which facilitate rapid starting and restarting of high intensity lamps. The entire contents of U.S. Pat. Nos. 5,047,694 and 4,890,041 are incorporated herein by reference.

It is also important to provide an emergency power supply, which will operate in place of the normal power supply if the normal power supply fails, to thus keep the light from turning off unintentionally. Various types of power failure detection circuits are known in the art which can detect when a failure occurs in a main power supply, and then enable power to be provided by an emergency power supply during a failure. However, many of these types of devices are complicated in both design and operation. Furthermore, these devices are also susceptible to minor fluctuations in the voltage provided by the main power supply.

Examples of known emergency lighting circuits are described in U.S. Pat. No. 4,057,750 to Elms et al., U.S. Pat. No. 4,686,424, and published Japanese Patent Application No. 3-49188.

Therefore, a continuing need exists for a device that is capable of effectively providing power from an emergency power supply to a lighting device when a failure occurs in the main power supply, and which is also simple in construction and not adversely affected by fluctuations in the voltage provided by the main power supply.

SUMMARY OF THE INVENTION

Accordingly, the present invention provides an apparatus and method for supplying emergency power to a lighting device, in particular, an HID lamp, when a failure occurs in a main power supply. Specifically, the apparatus includes a relay circuit having a coil that is coupled across the terminals of the main power supply. The relay is typically a normally open double-pole double throw relay, but can be any suitable type of relay known in the art.

When the coil of the relay is energized by the voltage provided by the main power supply, the contacts of the relay are closed to provide the voltage supplied by the main power supply to a ballast circuit which drives an HID lamp. However, when the voltage provided by the main power supply drops below a level sufficient to maintain the relay in the thrown position, the relay returns to the normally open position in which the relay contacts provide a voltage supplied by an emergency voltage supply to the ballast circuit. In this event, the ballast circuit drives the HID lamp with the emergency voltage provided by the emergency voltage supply.

Alternatively, the circuit of the present invention includes a rectifier having inputs that are coupled to the main power supply. The rectifier rectifies the AC voltage provided by the main power supply into a DC voltage that is provided at the output of the rectifier. A capacitive element is coupled between the output terminals of the rectifier. A resistive element also can be coupled in series with the capacitive element between the output terminals of the rectifier.

The capacitive element is further coupled across the coil of a DC coil relay. The DC coil relay has terminals that are coupled to the main power supply and an emergency power supply. The DC coil relay can be, for example, any suitable relay such as a normally open double-pole double throw relay whose normally open terminals are coupled to the emergency power supply. Hence, when the relay is not energized, the voltage provided by the emergency power supply is provided by the relay to the ballast circuit which in turn drives the HID lamp.

However, when the main power supply provides a voltage that is rectified to provide a DC voltage sufficient to throw the relay, the relay operates in a closed position in which the closed position terminals of the relay couple the main supply to the ballast circuit. In this event, the ballast circuit drives the lamp by the voltage provided from the main power supply. However, if the voltage provided by the main power supply falls below a predetermined level which, when rectified, provides a DC voltage insufficient to maintain the relay in the thrown position, the relay returns to the normally open position in which the voltage provided by the emergency power supply is coupled via the normally open terminals to the ballast circuit. In this event, the ballast circuit drives the HID lamp with the voltage provided by the emergency power supply.

Alternatively, the circuit of the present invention can include an AC relay having a coil that is coupled across an emergency power supply. The relay can be any suitable type of relay, such as a normally open single-pole double-throw AC relay having its normally open terminals coupled to a normal power supply. Hence, when the emergency power supply is off or does not provide a voltage sufficient to close the relay, the relay will provide a voltage from the normal power supply to the ballast circuit. The ballast circuit in turn drives the HID lamp with this normal voltage.

However, when the emergency power supply is activated and provides a voltage sufficient to throw the relay, the relay will operate in the closed mode so as to provide a voltage from the emergency power supply to the ballast circuit. In this event, the ballast circuit drives the HID lamp with that emergency voltage. When the emergency voltage falls below a level sufficient to maintain the relay in the thrown position, the relay returns to the normally open position and provides the voltage from the main power supply to the ballast circuit so that the ballast circuit can drive the HID lamp with the main voltage.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
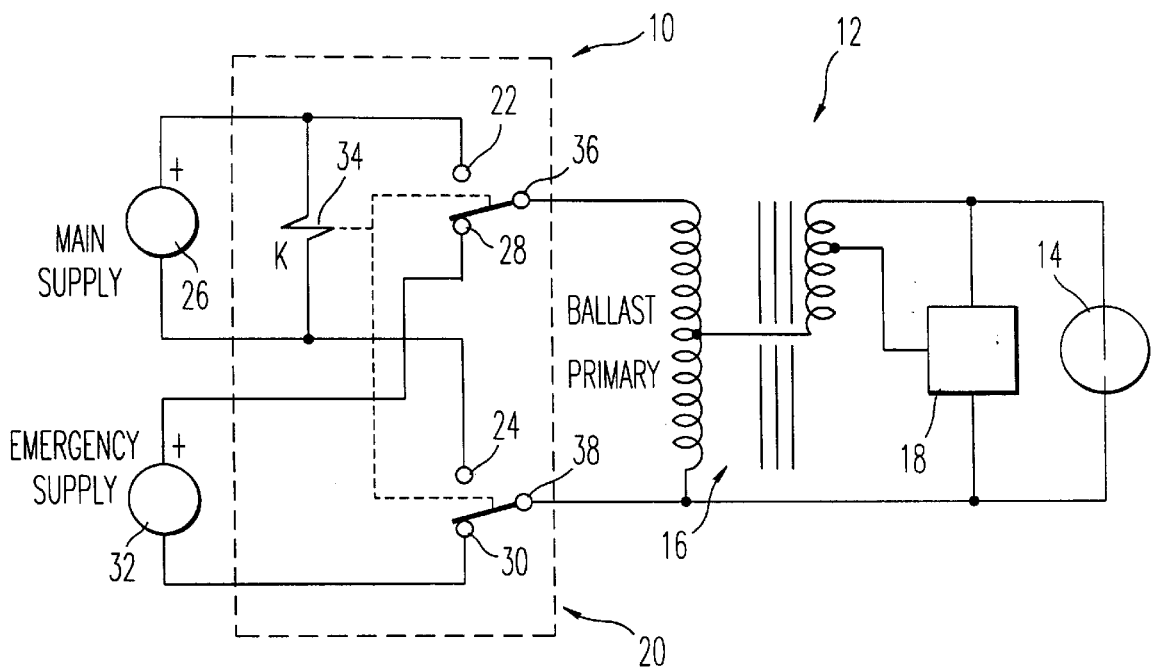
FIG. 1 is a circuit diagram illustrating an example of an emergency power switching circuit according to an embodiment of the present invention.

FIG. 1 illustrates an embodiment of a circuit 10 according to the present invention for alternately providing voltage from a main power supply and an emergency power supply to a lighting device 12. The lighting device 12 can be any type of conventional lighting device known to one skilled in the art. In this embodiment, the lighting device 12 includes a high intensity discharge lamp 14, which can be, for example, a 350 watt 50,000 lumen high-pressure sodium lamp. The lamp 14 is driven by a ballast circuit 16 and an ignitor 18 as described, for example, in U.S. Pat. Nos. 5,057,694 and 4,890,041 to Nuckolls, et al.

Figure 2:
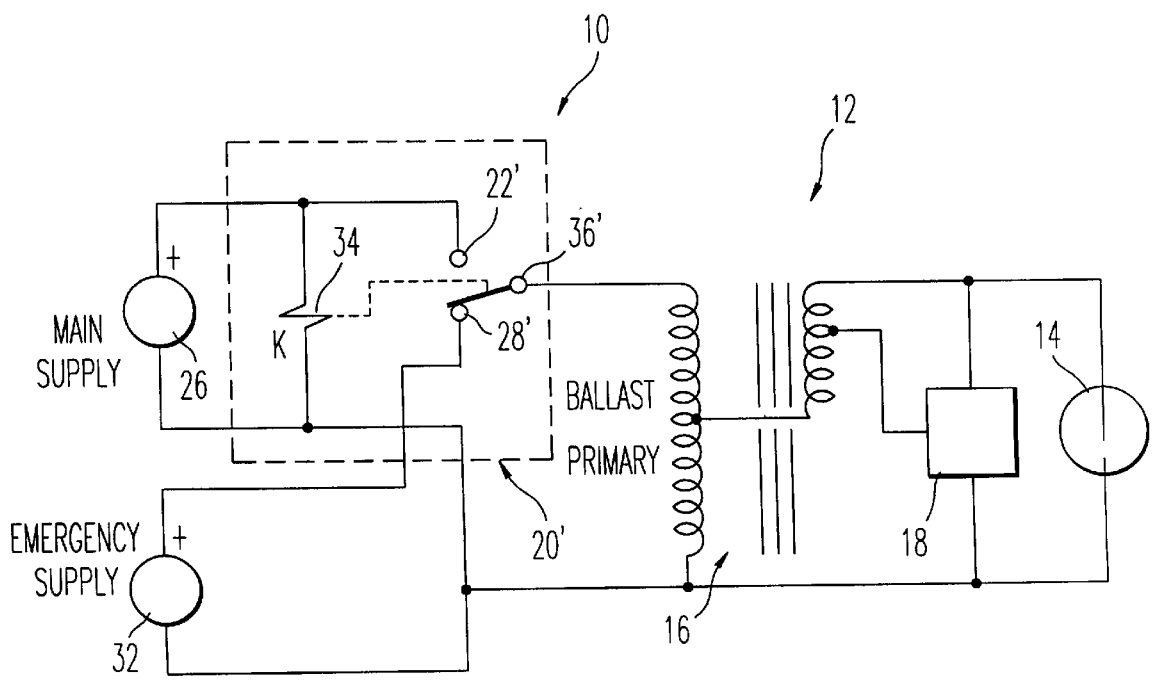
FIG. 2 is a circuit diagram illustrating a variation of the emergency power switching circuit shown in FIG. 1.

As illustrated, the circuit 10 includes a relay 20 having terminals 22 and 24 coupled to a main power supply 26 and terminals 28 and 30 coupled to the terminals of an emergency power supply 32. The main power supply 26 and emergency power supply 32 are both AC power supplies which, for example, provide 120 volts AC at 60 Hz. Of course, the main power supply 26 and emergency power supply 32 can have any rating and frequency as would be appreciated by one skilled in the art to be suitable with any type of lighting device. Furthermore, as illustrated, the relay 20 is a double-pole double-throw type relay. However, as shown in FIG. 2, the relay can be a single-pole double-throw relay 20'. In this event, the common terminals of the main power supply 26, emergency power supply 32, ballast circuit 16, ignitor 18 and lamp 14 are coupled together as illustrated.

The relay 20 includes a coil 34 which is coupled across the terminals of the main power supply 26. In this embodiment, the relay 20 is an AC relay that is activated by the voltage supplied to the coil 34 by the main power supply 26.

The operation of the apparatus shown in FIGS. 1 and 2 will now be described with reference to FIG. 3.

Specifically, the relay 20 in its normally open position will connect the poles 28 and 30 to terminals 36 and 38, respectively, and thus to the ballast input terminals when a voltage insufficient to throw the relay 20 is provided to the coil 34. Accordingly, the voltage provided by the emergency power supply 32 is provided to the ballast circuit 16 which in conjunction with ignitor 18, operates the lamp 14. In a similar manner, in the single-pole double-throw configuration shown in FIG. 2, the relay 20' in its normally open position connects terminal 28' to terminal 36'. Thus, the voltage provided by emergency supply 32 is supplied to the ballast circuit 16 which along with ignitor 18 operates lamp 14.

Figure 3:
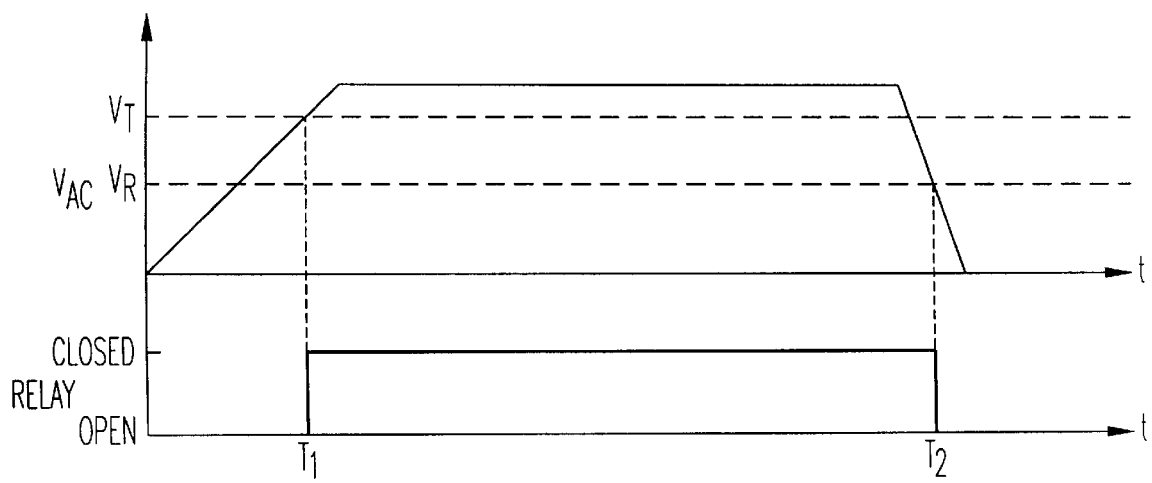
FIG. 3 is a waveform and timing diagram illustrating the operation of the circuits shown in FIGS. 1 and 2.

However, when the main power supply 26 is active and provides an AC voltage $V_{AC}$ that is greater than the threshold voltage $V_T$ of the coil 34, the relay 20 becomes closed as indicated at time $T_1$ in FIG. 3. At this time, the relay 20 connects the terminals 22 and 24 that are coupled to the main supply 26 to output terminals 36 and 38, respectively, to provide the voltage from the main supply to the ballast circuit 16. In a similar manner, relay 20' connects the terminal 22', that is coupled to the main supply 26, to terminal 36' to provide the voltage from the main supply to the ballast circuit 16. Hence, the ballast circuit 16 and ignitor 18 operate the lamp 14 based on this main AC voltage provided by main supply 26.

As long as the voltage provided by main supply 26 is sufficient to keep the relay 20 in a closed position, the relay 20' continues to keep the terminals 22 and 24 coupled to output terminals 36 and 28, respectively, and thus continue to supply the AC voltage $V_{AC}$ from the main supply to the ballast circuit 16. Likewise, in the embodiment shown in FIG. 2, the relay 20' continues to keep the terminal 22' connected to output terminal 36' and thus continue to supply the AC voltage $V_{AC}$ from the main supply to the ballast circuit 16.

However, if at any time the voltage $V_{AC}$ decreases to below the recovery voltage $V_R$ of the relay 20, as shown at time $T_2$, the relay will return to its open state. In this event, the power no longer is provided from the main supply 26 to the ballast circuit 16, but rather, the relay 20 connects terminals 28 and 30, which are coupled to the emergency supply 32, to output terminals 36 and 38, respectively, to provide the emergency voltage to the ballast circuit 16.

Likewise, if at any time the voltage $V_{AC}$ decreases to below the recovery voltage $V_R$ of the relay 20', relay 20' connects terminal 28', which is coupled to the emergency supply 32, to terminal 36' to provide the emergency voltage to the ballast circuit 16. Hence, the ballast circuit 16 and ignitor 18 operates lamp 14 with this emergency AC voltage provided by the emergency supply 32.

The apparatus shown in FIGS. 1 and 2 are useful in effectively switching to an emergency supply when the main supply fails. However, the operation of the circuits shown in FIGS. 1 and 2 can be affected by fluctuations in the voltage provided by the main supply 26. That is, if at any time the voltage provided by main supply 26 drops below the recovery voltage level $V_R$ of the relay 20, the relay will assume an open position. In particular, due to the presence of the ballast circuit 16, the voltage provided by the main supply 26 can experience a sagging phenomenon from time to time during which the voltage will decrease for short intervals. The phenomena often occurs during the inrush of magnetic excitation current drawn by the ballast 16 upon initial application of power.

However, if the voltage decreases to below the recovery voltage threshold $V_R$, the relay will switch to the open state during that sagging period, and then switch back to the closed state when the AC voltage recovers. This sagging of the voltage provided by the main supply 26 can cause the relay to begin oscillating between the open and closed positions, thus potentially destroying the relay contacts and damaging the ballast circuit and lamp components.

Figure 4:
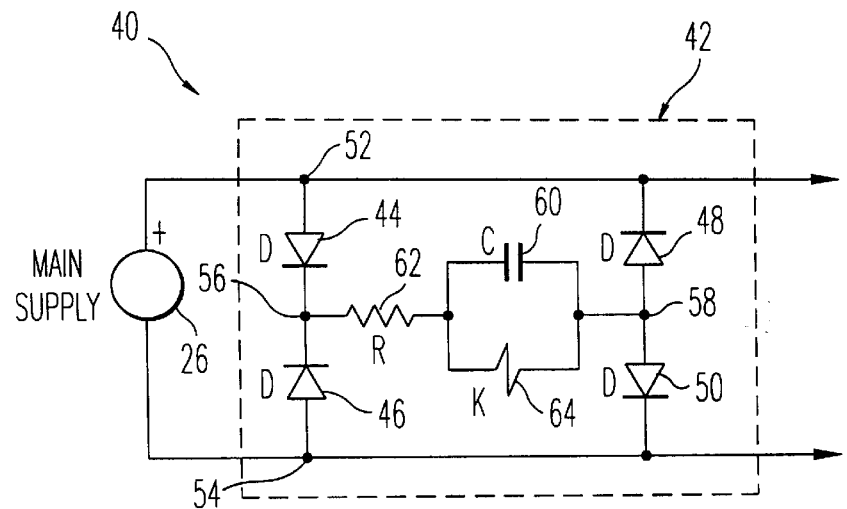
FIG. 4 is a circuit diagram of an example of a rectifier circuit for use in an emergency power switching circuit according to another embodiment of the present invention.

Another embodiment of the present invention has been developed which is not adversely affected by any sagging that may occur in the AC voltage provided by the main power supply. Specifically, as shown in FIG. 4, a circuit 40 according to this embodiment of the present invention employs a rectifier circuit 42 which includes diodes 44 through 50. As illustrated, the rectifier 42 is a full-wave rectifier circuit. However, the rectifier can also be a half-wave rectifier if desired.

The AC inputs 52 and 54 of the rectifier 42 are coupled to the output terminals of the main supply 26 as shown. The rectifier 42 thus functions to convert the AC voltage signal provided by the main supply 26 into a DC voltage signal that the rectifier 42 outputs at its output terminals 56 and 58.

The rectifier circuit 42 further includes a capacitive element 60, such as a capacitor or the like, and a resistive element 62, such as a resistor or the like, that are coupled in series between output terminals 56 and 58 of the rectifier circuit 42. In this embodiment, the capacitive element 60 is a capacitor having a value of approximately 100 microfarads and the resistive element is a resistor having a value of 1200 ohms. Also, the coil resistance of the DC coil 64 (discussed below) is approximately 6800 ohms. Of course, the value of the capacitor, resistor, and coil resistance can be any value as would be appreciated by one skilled in the art.

Figure 5:
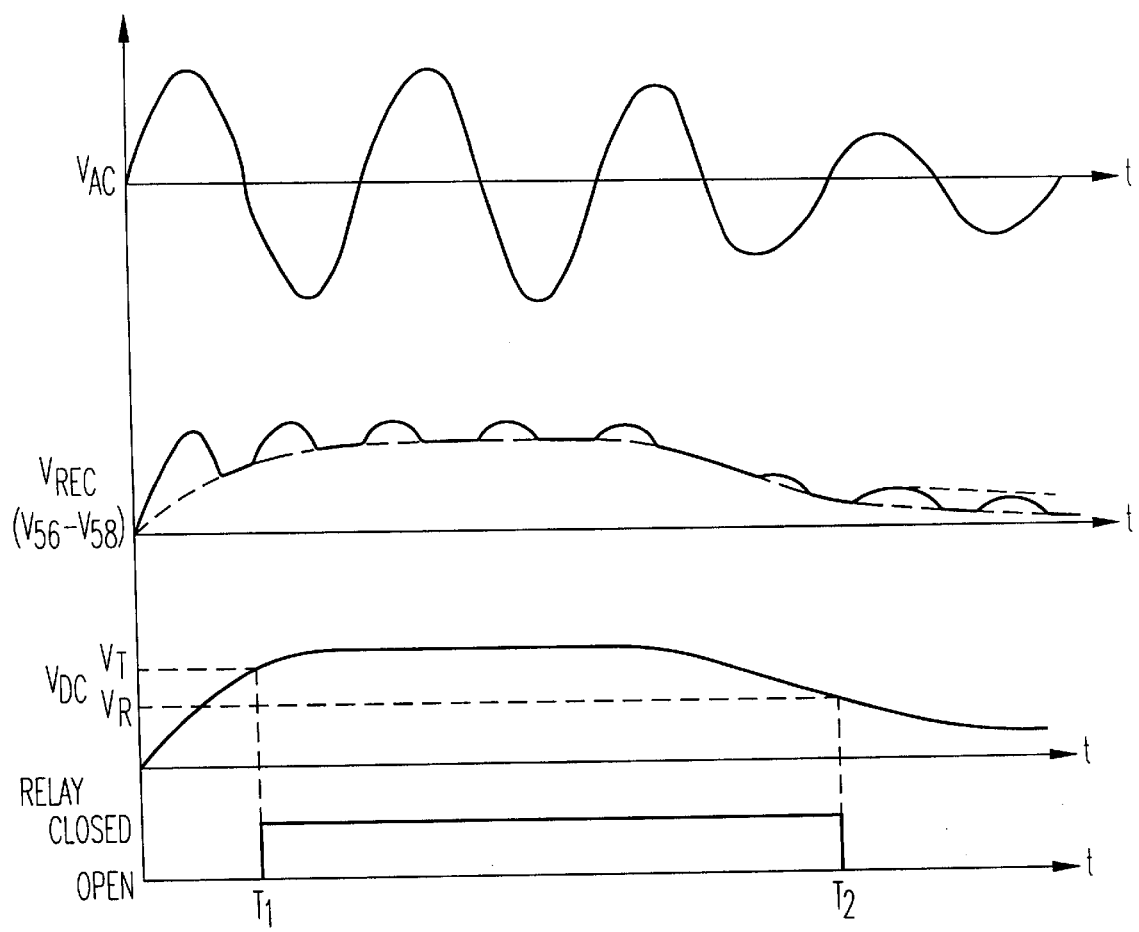
FIG. 5 is a waveform and timing diagram illustrating the operation of the circuits shown in FIGS. 6 and 7.

As shown in FIG. 5, the rectifier circuit 42 converts the AC voltage signal provided by main supply 26 into a DC voltage $V_{REC}$ signal that appears across output terminals 56 and 58. The capacitive element 60 is charged by the DC voltage and hence, smoothes out the DC voltage $V_{REC}$ as voltage $V_{DC}$.

Figure 6:
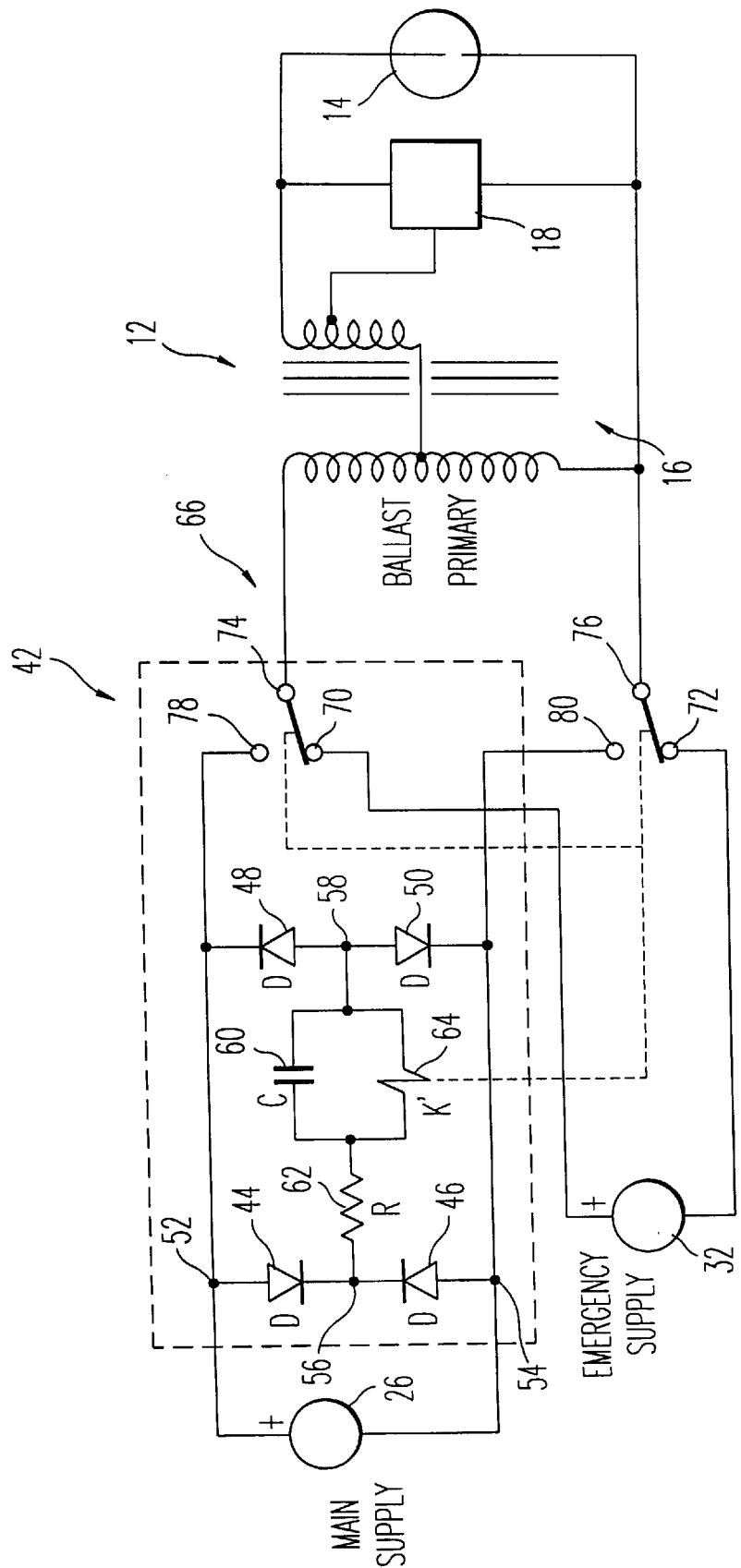
FIG. 6 is a circuit diagram illustrating an example of an emergency power switching circuit employing a rectifier circuit as shown in FIG. 4 according to a further embodiment of the present invention.
Figure 7:
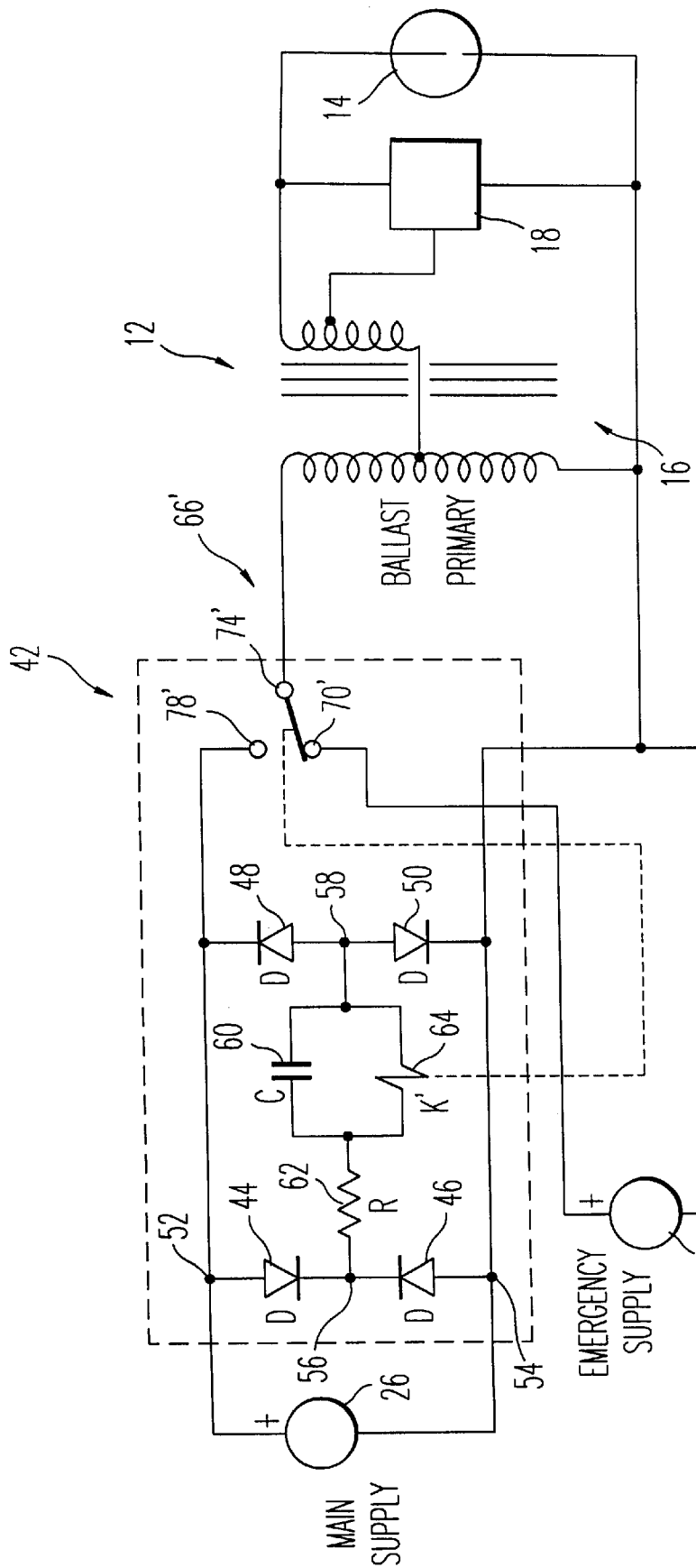
FIG. 7 is a circuit diagram illustrating a variation of the emergency power switching circuit shown in FIG. 6.

The capacitive element 60 is coupled across a DC coil 64 of a DC relay 66 which is shown in the circuit configuration illustrated in FIG. 6. Specifically, the circuit shown in FIG. 6 is similar to that shown in FIG. 1, but employs a DC coil relay 66 that is driven by the DC voltage that appears across the capacitive element 60. The DC coil relay 66 can be a double-pole double-throw relay as shown, or alternatively, as illustrated in FIG. 7, can be a single-pole double-throw relay 66'. In such a single-throw configuration, the common terminals of the main power supply 26, emergency power supply 32, ballast circuit 16, ignitor 18 and lamp 14 are coupled together. In both the single-throw and double-throw configuration, the relay 66 or 66' is preferably a normally-open relay, but, of course, can be any type of relay suitable to effect the operation described below.

The operation of the circuits shown in FIGS. 6 and 7 will now be described with respect to FIGS. 5 and 8.

As shown in FIG. 5, the rectifier circuit 42 will rectify the AC voltage signal $V_{AC}$ provided by main power supply 26 into a rectified voltage signal $V_{REC}$ that the rectifier 42 provides across its output terminals 56 and 58. The capacitive element 60 will become charged to a DC voltage $V_{DC}$, as illustrated, having a value based on the value of the rectified voltage $V_{REC}$. When the voltage $V_{DC}$ is below the relay threshold voltage $V_T$, the relay 66 remains in its normally open state in which terminals 70 and 72 that are coupled to the output terminals of emergency power supply 32 are connected to output terminals 74 and 76, respectively, of the relay 66. Similarly, the relay 66' (FIG. 7) remains in its normally open position in which terminal 70' that is coupled to the terminal of the emergency power supply 32 is connected to output terminal 74'. Hence, the relay 66 (relay 66') provides the voltage from the emergency power supply 32 to the ballast circuit 16. The ballast circuit 16 and ignitor 18 hence operate the lamp 14.

As further shown in FIG. 5, when the voltage $V_{DC}$ reaches the threshold voltage $V_T$ of the relay 66, the voltage $V_{DC}$ energizes the coil 64 of the relay to cause the relay 66 to assume the closed state. In the closed state, terminals 78 and 80, which are coupled to the output terminals of main power supply 26, are coupled to terminals 74 and 76, respectively, of the relay. Hence, the relay 66 provides the AC voltage supplied by the main supply to the ballast circuit 16 which in conjunction with ignitor 18 thus enables the HID lamp 14 to operate.

Similarly, when the voltage $V_{DC}$ reaches the threshold voltage $V_T$ of the relay 66', the voltage $V_{DC}$ energizes the coil 64 of the relay to cause the relay 66' to assume the closed state. In the closed state, terminal 78' which is coupled to the output terminal of main power supply 26 becomes coupled to terminal 74 of the relay 66'. Hence, the relay 66' provides the AC voltage supplied by the main supply to the ballast circuit 16. The ballast circuit 16 and the ignitor 18 thus cause the HID lamp 14 to operate.

Figure 8:
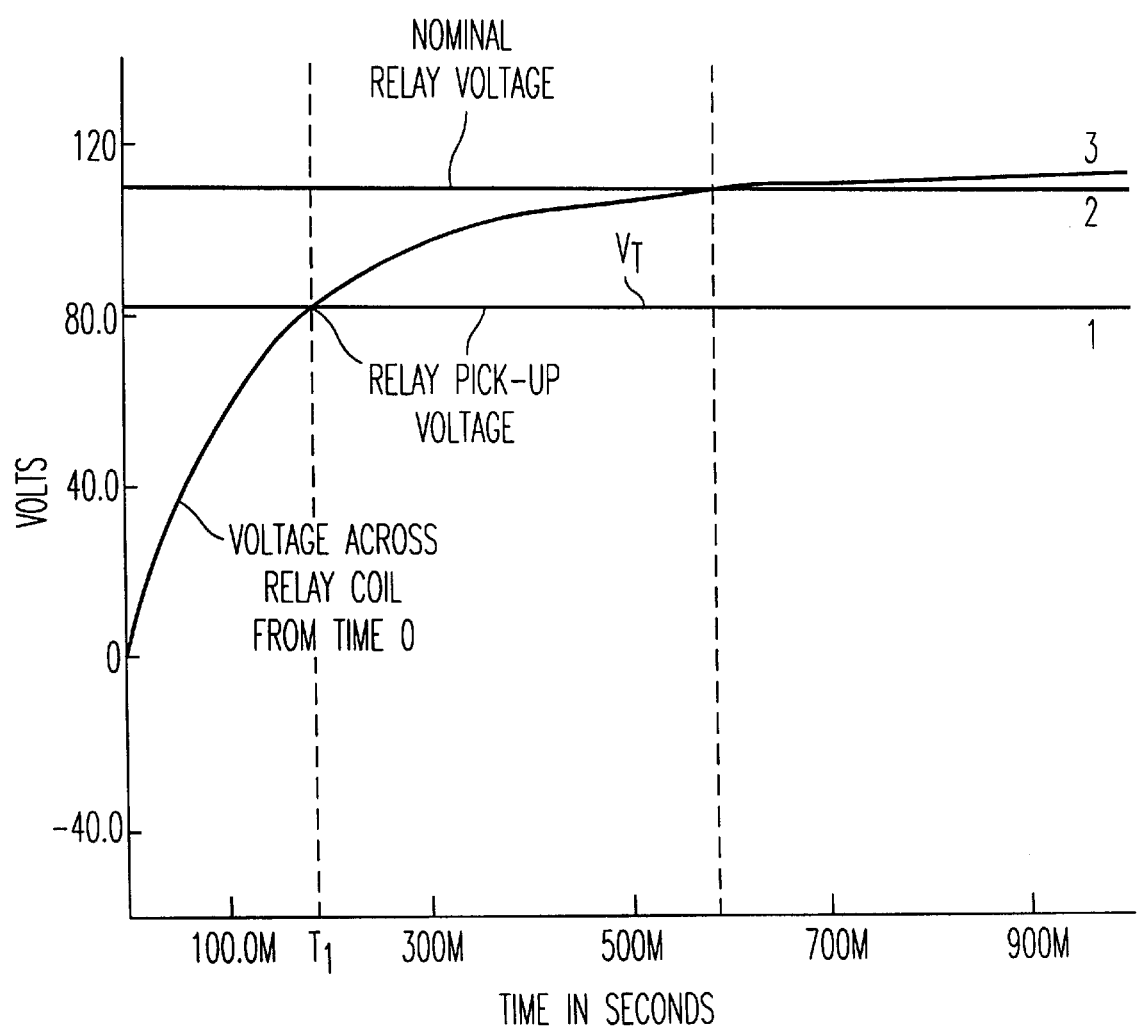
FIG. 8 is a waveform and timing diagram illustrating an example of the charging of the capacitive element employed in the circuits shown in FIGS. 6 and 7.

As illustrated in FIG. 8, the voltage $V_T$ at which the relay 66 (or relay 66') will be thrown to the closed state is typically less than the rated voltage of the relay. The value of the capacitive element 60, resistive element 62 and coil relay 64 are selected such that the capacitive element 60 charges to assume a voltage $V_{DC}$ sufficient to trip the relay to the closed position within a desired time period. As shown, for example, in FIG. 8, the values of the capacitive element 60 and resistive element 62 are selected such that the capacitor charges to a voltage of 82.6 volts (the voltage $V_T$) in 187 milliseconds after the 120 volt AC voltage $V_{AC}$ is applied to the rectifier circuit 42. It is noted that in this example, the DC relay 66 has a rated voltage of 110 volts, and the voltage of the capacitor will reach that voltage approximately 587 milliseconds after the AC voltage is applied to the rectifier circuit 42.

As shown in FIG. 5, if the AC voltage decreases, the rectified voltage $V_{REC}$ also decreases. When the rectified voltage $V_{REC}$ decreases, the capacitor begins to discharge and hence, the voltage $V_{DC}$ across the capacitor decreases. When the voltage $V_{DC}$ decreases to the relay recovery or "drop-out" voltage $V_R$, the relay 66 will return to the normally open position. In doing so, the relay 66 will reconnect terminals 70 and 72, that are coupled to the emergency power supply 32, to output terminals 74 and 76, respectively. Hence, the relay 66 will again provide the voltage supplied by the emergency voltage supply 32 to the ballast circuit 16, and the ballast circuit 16 in conjunction with ignitor 18 will drive the HID lamp 14.

Similarly, in the single throw relay 66' arrangement shown in FIG. 7, when the voltage $V_{DC}$ decreases to the relay recovery voltage $V_R$, the relay 66' will return to the normally open position. In doing so, the relay 66' will reconnect terminal 70', that is coupled to the emergency power supply 32, to output terminal 74'. Hence, the relay 66' will again provide the voltage supplied by the emergency voltage supply 32 to the ballast circuit 16, and the ballast circuit 16 and ignitor 18 will drive the HID lamp 14.

It is noted that the relay recovery voltage $V_R$ is typically lower than the threshold voltage $V_T$, and should be selected to be a value about at which the AC voltage will be insufficient to power the lamp 14 properly. It is noted that the values of the capacitive element 60, resistive element 62 and relay coil 64 can be selected so that the capacitive element 60 discharges at a desired rate when the AC voltage $V_{AC}$ drops. It is desirable to select the value of the relay recovery voltage $V_R$ and the values of the capacitive element 60, resistive element 62 and relay coil 64 such that the capacitive element 60 will not discharge to the relay recovery voltage $V_R$ when the value of the AC voltage $V_{AC}$ drops for short periods of time.

Specifically, the values should be selected such that the capacitive element will not discharge to the relay recovery voltage $V_R$ when the value of the AC voltage $V_{AC}$ drops during the "sagging period" discussed above. In this event, the relay circuit 66 or 66' is essentially unaffected by short drops in the AC voltage. The operation of the capacitive element 60 will prevent the relay 66 or 66' from switching due to these short drops. Hence, the operation of the relay 66 or 66' is stabilized.

Figure 9:
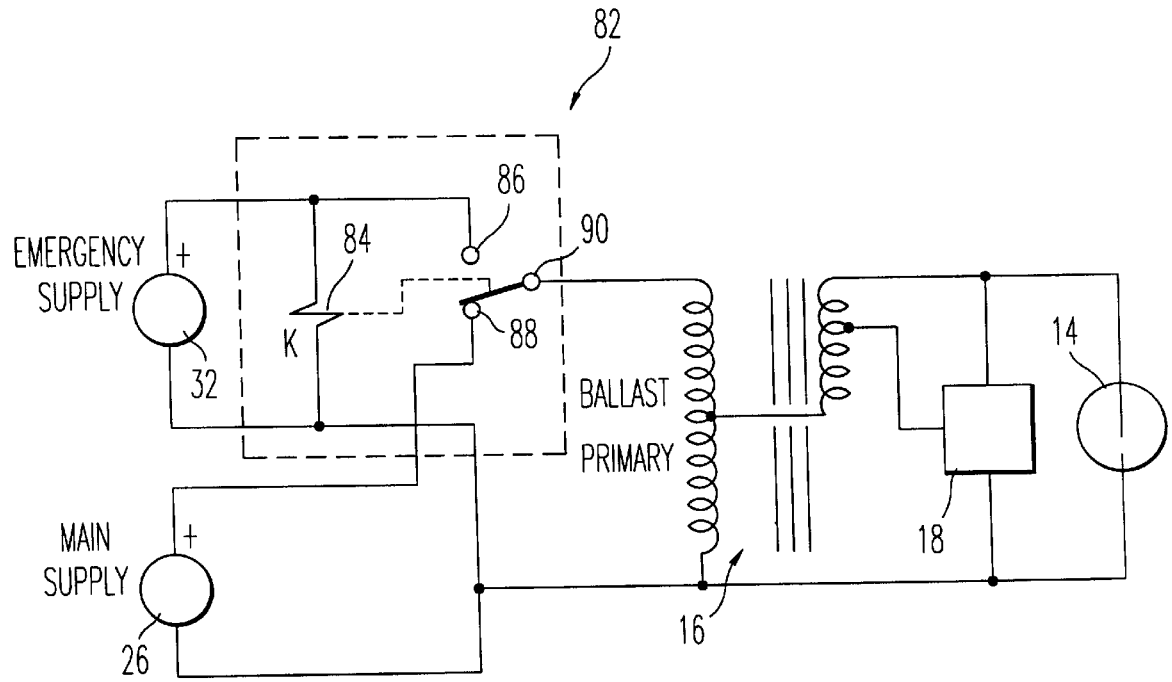
FIG. 9 is a circuit diagram illustrating an example of an emergency power switching circuit according to another embodiment of the present invention.

In a further embodiment of the invention as shown in FIG. 9, an AC coil relay 82 is employed as the switching device to switch from a main power supply 26 to an emergency power supply 32 and vice versa. Specifically, the AC relay 82 has a AC coil 84 having terminals 86 and 88 coupled to the terminals of the emergency power supply 32. In this example, the relay is a single-pole double-throw relay. However, the circuit can be configured such that the relay can be a double-pole double-throw relay or any suitable type of relay which will effect the operation described below. Also, the rated voltage of the relay can be selected to be any desired rating.

The operation of the circuit shown in FIG. 9 will now be described with regard to FIG. 3.

When the voltage of the emergency power supply increases to the throw voltage $V_T$ of the AC relay 82 at time T1 as shown, for example, in FIG. 3, the normally open relay will close. In this event, the terminal 86 of the relay is coupled to the terminal 90 of the relay and hence, the relay provides the emergency power supply to the ballast circuit 16 which in conjunction with ignitor 18 operates the HID lamp 14. If the voltage of the emergency power supply then decreases below the recovery voltage $V_R$ of the relay 82, the relay will again return to its normally open position to provide power from the main power supply 26 to the ballast circuit 16 and thus cause the lamp 14 to be operated by the voltage provided by the main power supply. Of course, the relay 82 can be configured so that the throw voltage $V_T$ and the recovery voltage $V_R$ of the relay are any value suitable to achieve the operation discussed above.

Additionally, it is noted that in the discharge lighting industry, multi-tapped ballast are often used which allow for the accommodation of several input voltages. That is, in the event that the value of the voltage provided by an emergency power supply is different than that provided by the main power supply, it is desirable to use a multi-tapped ballast so that that single ballast can accommodate the different voltage levels. A multi-tapped ballast 161 is, for example, an auto-transformer ballast that has several primary voltage taps which can accommodate several input voltages.

Figure 10:
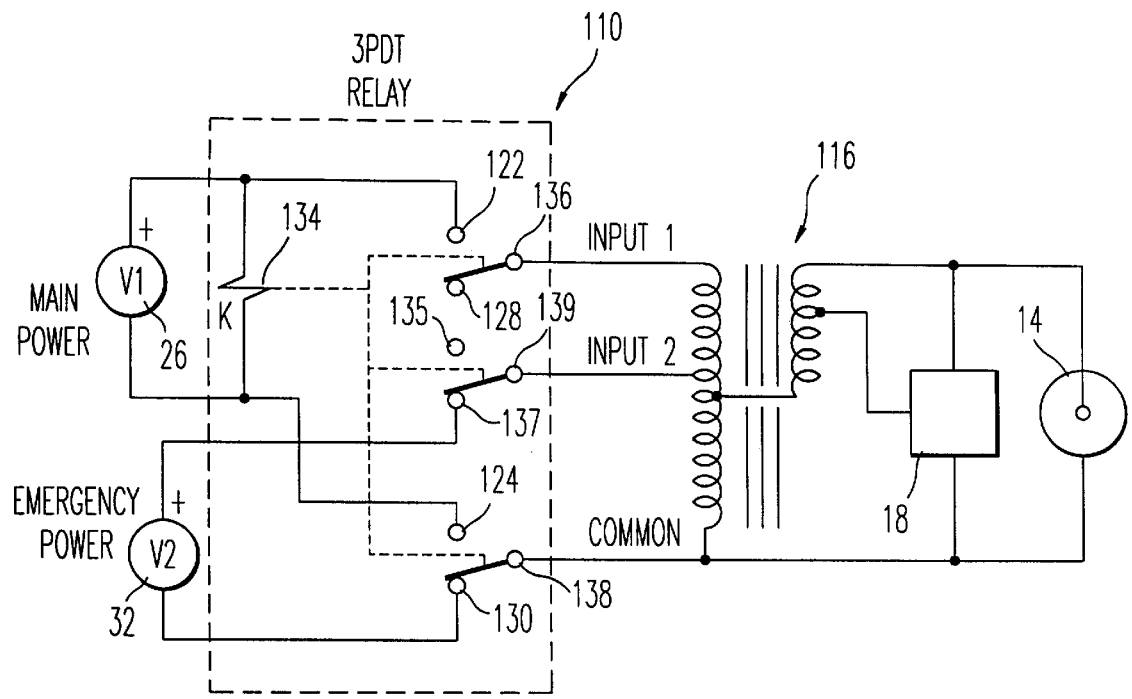
FIG. 10 is another circuit diagram illustrating an example of an emergency power switching circuit, similar to that shown in FIG. 1, which employs a multi-tapped ballast and a triple-pole double-throw relay.

FIG. 10 illustrates a circuit similar to that shown in FIG. 1 in which a triple-pole double-throw relay 110 is used. The circuit operates in a manner similar to the circuits shown in FIGS. 1 and 2 as discussed above. However, because in this example, the maximum value of the voltage V1 provided by the main power supply is different (i.e., larger) than the maximum value of the voltage V2 provided by the emergency power supply, it is necessary to use the multi-tapped ballast 161 to accommodate these voltages. It is also desirable to use the triple-pole double-throw AC relay 110 to connect the terminals of the main power supply and emergency power supply to the appropriate taps of the ballast.

In particular, it is noted that terminals 122, 128 and 136 of the relay essentially correspond to terminals 22, 28 and 36 of the relay 10 shown in FIG. 1, and the terminals 124, 130 and 138 of relay 110 essentially correspond to the terminals 24, 30 and 38, respectively, of the relay 10 in the circuit shown in FIG. 1. However, relay 110 in the circuit shown in FIG. 10 has additional terminals 135, 137 and 139. Terminal 136 is connected to the first input terminal of ballast circuit 116, and terminal 139 is connected to the second input terminal of the ballast circuit 116.

Hence, as in the operation of circuit 1 discussed above, when the level of the voltage provided by the main power supply 26 is insufficient to activate relay 110, the relay 110 will remain in its normal relaxed position in which terminals 128, 137 and 130 are coupled to terminals 136, 139 and 138, respectively. In this condition, the terminals of the emergency power source are coupled to the second input terminal and common terminal of the ballast 116. Thus, the ballast 116 and ignitor (18) will drive the lamp 14 with the voltage provided by the emergency power supply.

However, when the level of the voltage provided by the main power supply is sufficient to activate the relay 110, terminal 122 will become coupled to terminal 136, terminal 135 will be coupled to terminal 139, and terminal 124 will become coupled to terminal 138. In this condition, the terminals of the main power supply are coupled to the first input terminal and the common terminal of the ballast 116. Thus, the ballast and the ignitor will drive the lamp 14 with the voltage provided by the main power supply 26.

Figure 11:
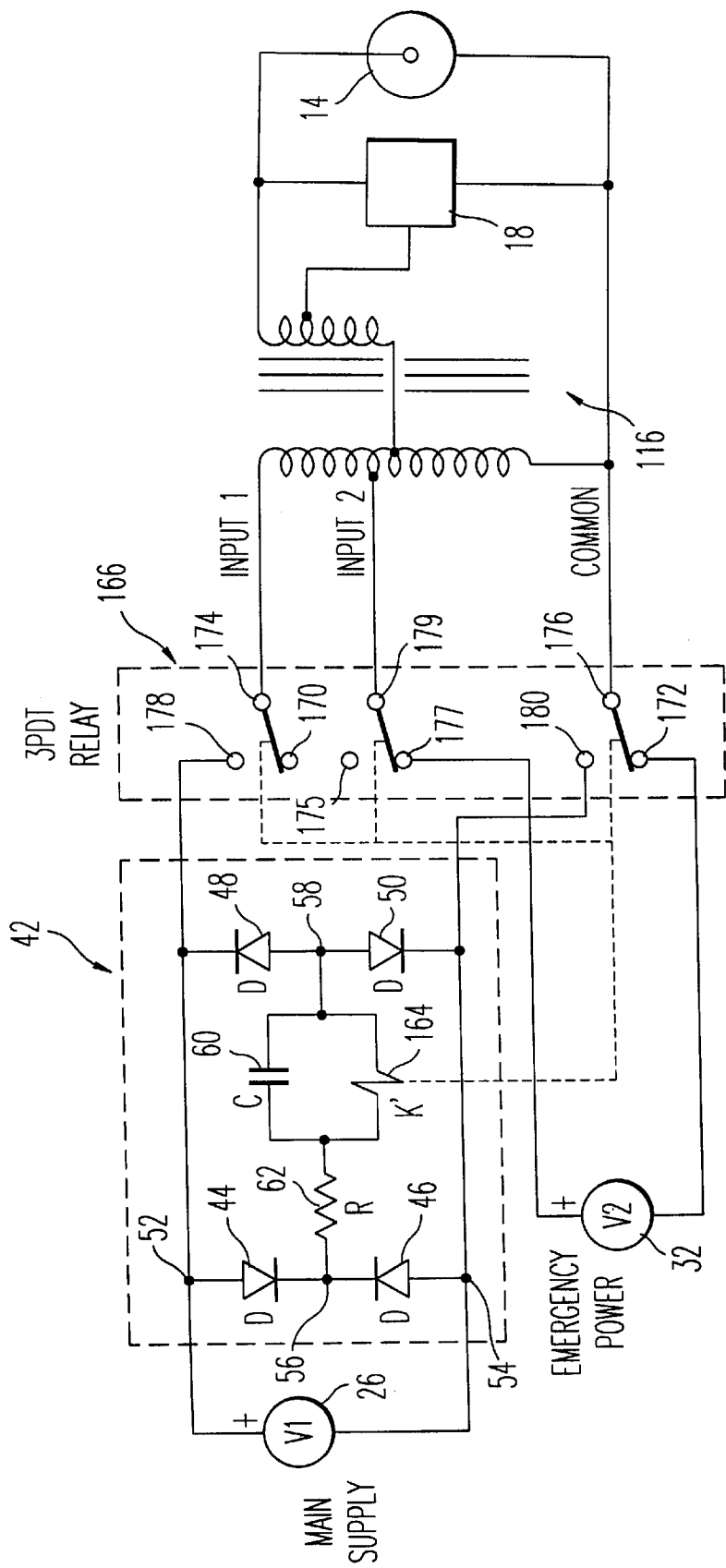
FIG. 11 is a circuit diagram illustrating an example of an emergency power switching circuit, similar to that shown in FIG. 6, which employs a triple-pole double-throw relay.

This triple-pole double-throw type relay 110 can also be employed in the circuits shown in FIGS. 6 and 9, for example, if the level of voltage provided by the main power supply differs from the level of the voltage provided by the emergency power supply in those circuits. As shown in FIG. 11, relay 166 is a DC relay as in the circuits shown in FIGS. 6 and 7, the DC coil 164 of the relay 166, which is a triple-pole double-throw type relay, is coupled across capacitor 60 in a manner similar to that in which DC coil 64 of relay 66 is coupled across capacitor 60 in FIG. 6. The relay 166 therefore essentially operates in the manner as the relay 66 in the circuits shown in FIG. 6.

That is, when the rectified voltage appearing across capacitor 60 and thus across DC relay coil 164 is insufficient to activate the relay 166, the relay 166 remains in its normal position where the emergency power is provided to the multi-tapped ballast 116. Specifically, terminals 172 and 177, which are coupled to the output terminals of emergency power supply 32, are connected to terminals 176 and 179, respectively, so that the terminals of the emergency power supply 32 are thus connected to the second input terminal and common terminal of the multi-tapped ballast 116. Accordingly, the voltage provided by the emergency power supply 32 is provided to the ballast 116 which in conjunction with the ignitor (18) powers lamp 14.

However, when the voltage provided by the main supply 26 is sufficient to provide a DC rectified voltage across capacitor 60 that is sufficient to activate the relay 166, the relay 166 will assume a position where terminals 178, 175 and 180 are coupled to terminals 174, 179 and 176, respectively. In this condition, the output terminals of the main supply 26, which are coupled to terminals 178 and 180, are connected to the terminals 174 and 176 which are in turn connected to the first input terminal and common terminal of the ballast 116. Hence, the power from the main power supply 26 is provided to the ballast 116 which, in conjunction with the ignitor, powers lamp 14.

When the voltage of the main power supply then drops to a level in which the capacitor 60 discharges below the recovery voltage of the relay 166, the relay 166 will return to its normal state in which terminals 170, 177 and 172 are coupled to terminals 174, 179 and 176, respectively. In that condition, the emergency power supply output terminals are thus coupled to the second input and common terminals of ballast 116 so that the voltage provided by the emergency power supply 32 is provided to the ballast 116, which in conjunction with the ignitor, powers the lamp 14.

Figure 12:
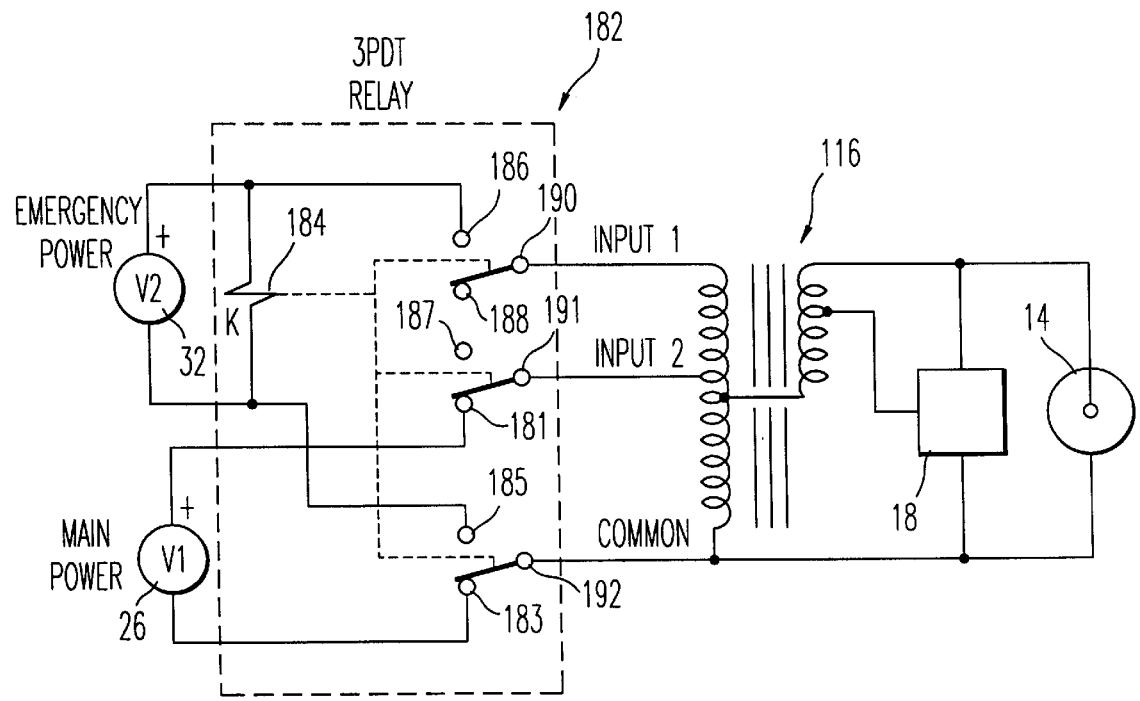
FIG. 12 is a circuit diagram illustrating an example of an emergency power switching circuit, similar to that shown in FIG. 9, which employs a triple-pole double-throw relay.

FIG. 12 shows a circuit similar to that shown in FIG. 9, but which employs a multi-tapped ballast 116. Specifically, the circuit employs a triple-throw double-pole AC relay 182 which operates in a manner similar to the relay 82 in the circuit shown in FIG. 9 as described above.

That is, when the voltage provided by the emergency power supply 32 is insufficient to activate the relay 182, the relay remains in its normal state in which the voltage provided by the main power supply 26 is provided to the multi-tapped ballast 116. The ballast 116 in conjunction with the ignitor (18) thus drives the lamp 14. Specifically, the terminals 181 and 183, which are coupled to the output terminals of main power supply 26, are connected to terminals 191 and 192, respectively, so that the output terminals of the main power supply 26 are thus coupled to the second input terminal and common terminal of the multi-tapped ballast 116. In this condition, the voltage output by the main power supply is provided to the ballast 116, which in conjunction with the ignitor powers the lamp 14.

However, when the level of the voltage up by the emergency power supply 32 is sufficient to activate the relay 182, the terminals 185, 186 and 187 become coupled to terminals 192, 190 and 191, respectively. In this condition, the output terminals of the emergency power supply 32, which are coupled to terminals 186 and 185, become coupled to terminals 190 and 192, respectively. Accordingly, those terminals of the emergency power supply 32 become coupled to the first input terminal and common terminal of the multi-tapped ballast 116. Hence, the voltage output by the emergency power supply 32 is provided to the multi-tapped ballast 116, which in conjunction with the ignitor powers the lamp 14.

However, when the emergency power supply drops to a level that is not sufficient to sustain the relay 182 in the thrown state, the relay will return to the normal state where terminals 188, 181 and 183 are coupled to terminals 190, 191 and 192, respectively. In this condition, the output terminals of the main power supply 26 are again coupled to the second input terminal and common terminal of the ballast 116. Hence, the voltage output by the main power supply 26 is provided to the ballast 116, which in conjunction with the ignitor uses this voltage to power the lamp 14.

It is noted, of course, that although a triple-pole double throw relay is shown in the circuits illustrated in FIGS. 10–12, the circuit can be configured to employ a ballast having a different multi-tapped arrangement and thus, use a relay having a different number of poles and/or contact configurations. Furthermore, the circuit can be configured to operate if the emergency power supply provides a voltage larger than the voltage provided by the main power supply, or vice versa, simply by configuring the relay and ballast so that the output terminals of the emergency power supply and main power supply are coupled to the appropriate input terminals of the multi-tapped ballast such that the appropriate voltage is output by the ballast 116.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A circuit for use with a high intensity discharge lighting device, comprising:

a drive circuit, including an ignitor, which is coupled to the high intensity discharge lighting device;

a rectifier circuit having a first AC input which receives a first AC voltage supplied by a first AC power supply, and a first output at which the rectifier circuit provides a DC output voltage based on the received first AC voltage, the first AC voltage being capable of varying between first and second magnitudes;

a DC coil relay, which operates in a first mode of operation to couple the first AC power supply to provide the first AC voltage to the drive circuit which ignites and drives the high intensity discharge lighting device, and which operates in a second mode of operation to couple a second AC power supply to provide a second AC voltage to the drive circuit; and a capacitive elements coupled to the first output of the rectifier circuit and to the DC coil relay, and which provides a DC control voltage to the DC coil relay based on the DC output voltage to control the DC coil relay to operate in the first mode when the DC control voltage reaches a first value, such that the first AC voltage powers the drive circuit to ignite and drive the high intensity discharge lighting device, and to operate in the second mode when the DC control voltage reaches a second value, such that the second magnitude of the first AC voltage permits the high intensity discharge lighting device to extinguish, and the second AC voltage powers the drive circuit to re-ignite and drive the high intensity discharge lighting device, the capacitive element having a capacitance value such that a time period during which the DC control voltage reaches the second value after reaching the first value is at least equal to a time period during which the first AC voltage varies from the first magnitude to the second magnitude.

2. A circuit as claimed in claim 1, wherein the rectifier circuit is a full-wave rectifier.

3. A circuit as claimed in claim 1, wherein the drive circuit includes a ballast circuit, and the DC coil relay couples the first AC power supply to provide the first AC voltage to the ballast circuit in the first mode of operation and couples the second AC power supply to provide the second AC voltage to the ballast circuit during the second mode of operation.

4. A circuit as claimed in claim 3, wherein the lighting device further includes a high intensity discharge lamp, and the ballast circuit uses the first AC voltage to drive the lamp in the first mode of operation and uses the second AC voltage to drive the lamp during the second mode of operation.

5. A circuit as claimed in claim 1, wherein the rectifier circuit comprises a second output, and wherein the circuit further comprises a resistive element coupled in series with the capacitive element between the first and second outputs.

6. A circuit as claimed in claim 1, wherein the DC coil relay is a double-pole double-throw relay.

7. A circuit as claimed in claim 1, wherein the DC coil relay is configured to substantially prevent the second AC power supply from providing the second AC voltage to the drive circuit while enabling the first AC power supply to provide the first AC voltage to the drive circuit during the first mode of operation, and is configured to substantially prevent the first AC power supply from providing the first AC voltage to the drive circuit while enabling the second AC power supply to provide a second AC voltage to the drive circuit during the second mode of operation.

8. A circuit as claimed in claim 1, wherein the rectifier circuit further comprises:
   a second AC input;
   a second output;
   a resistive element coupled in series with the capacitive element between the first and second outputs;
   a first diode having an anode coupled to the first AC input and a cathode coupled to the resistive element;
   a second diode having an anode coupled to the second AC input and a cathode coupled to the resistive element;
   a third diode having an anode coupled to the capacitive element and a cathode coupled to the first AC input; and
   a fourth diode having an anode coupled to the capacitive element and a cathode coupled to the second AC input.

9. A circuit as claimed in claim 1, wherein the maximum magnitude of the first AC voltage is different from the maximum magnitude of the second AC voltage.

10. A circuit as claimed in claim 9, wherein one of the following conditions is met:
    the maximum magnitude of the first AC voltage is greater than the maximum magnitude of the second AC voltage; or
    the maximum magnitude of the first AC voltage is lower than the maximum magnitude of the second AC voltage.

11. A circuit as claimed in claim 9, wherein the lighting device includes a multi-tapped ballast circuit, and the DC coil relay couples the first AC power supply to provide the first AC voltage to one input terminal of the ballast circuit in the first mode of operation and couples the second AC power supply to provide the second AC voltage to another input terminal of the ballast circuit during the second mode of operation.

12. A circuit as claimed in claim 11, wherein the relay is a triple-pole double throw relay.

13. A method for applying power to a high intensity discharge lighting device, comprising the steps of:
    converting a first AC voltage supplied by a first AC power supply into a DC voltage, the first AC voltage being capable of varying between first and second magnitudes, and the DC voltage having a first value when the first AC voltage has the first magnitude and a second value when the first AC voltage has the second magnitude;
    when the DC voltage reaches the first magnitude, coupling the first AC power supply to provide the first AC voltage to power a drive circuit including an ignitor, which ignites and drives the high intensity discharge lighting device; and
    when the first AC voltage reaches the second magnitude, which permits the high intensity discharge lighting device to extinguish and causes the DC voltage to reach the second value, coupling a second AC power supply to provide a second AC voltage to power the drive circuit to re-ignite and drive the high intensity discharge lighting device, the time period during which the DC voltage varies from the first value to the second value being at least equal to the time period during which the first AC voltage varies from the first magnitude to the second magnitude.

14. A method as claimed in claim 13, wherein:
    the first AC power supply coupling step comprises the step of substantially preventing the second AC power supply from providing the second AC voltage to the drive circuit; and
    the second AC power supply coupling step comprises the step of substantially preventing the first AC power supply from providing the first AC voltage to the drive circuit.

15. A method as claimed in claim 13, wherein:
    the first AC power supply coupling step comprises the step of applying the DC voltage to a DC coil relay to control the DC coil relay to operate in a first mode in which the first AC power supply is coupled to provide the first AC voltage to the drive circuit; and
    the second AC power supply coupling step comprises the step of applying the DC voltage to the DC coil relay to control the DC coil relay to operate in a second mode in which the second AC power supply is coupled to provide the second AC voltage to the drive circuit.

16. A method as claimed in claim 13, wherein the converting step comprises the step of applying the first AC voltage to an input of a rectifier circuit to generate the DC voltage.

17. A method as claimed in claim 16, wherein the rectifier circuit includes DC output terminals and a capacitor having terminals coupled across the DC output terminals, and the converting step comprises the step of generating the DC voltage across the terminals of the capacitor.

18. A method as claimed in claim 17, wherein:
    the first AC power supply coupling step comprises the step of applying the DC voltage to a DC coil relay to control the DC coil relay to operate in a first mode in which the first AC power supply is coupled to provide the first AC voltage to the drive circuit; and
    the second AC power supply coupling step comprises the step of applying the DC voltage to the DC coil relay to control the DC coil relay to operate in a second mode in which the second AC power supply is coupled to provide the second AC voltage to the drive circuit.

19. A method as claimed in claim 18, wherein the drive circuit includes a ballast circuit, and wherein
    the first AC power coupling step further comprises the step of controlling the relay to provide the first AC voltage to the ballast circuit of the drive circuit when the DC voltage reaches the first value; and the second AC power coupling step comprises the step of controlling the relay to provide the second AC voltage to the ballast circuit of the drive circuit when the DC voltage reaches the second value.

20. A method as claimed in claim 13, wherein the drive circuit includes a ballast circuit, and wherein the first AC power coupling step comprises the step of coupling the first AC power supply to provide the first AC voltage to the ballast circuit of the drive circuit when the DC voltage reaches the first value; and the second AC power coupling step comprises the step of coupling the second AC power supply to provide the second AC voltage to the ballast circuit of the drive circuit when the DC voltage reaches the second value.

21. A method as claimed in claim 20, wherein the lighting device further includes a high intensity discharge lamp, and wherein in the first AC power coupling step, the ballast circuit uses the first AC voltage to drive the high intensity discharge lamp when the DC voltage reaches the first value; and in the second AC power coupling step, the ballast circuit uses the second AC voltage to drive the high intensity discharge lamp when the DC voltage reaches the second value.

22. A method as claimed in claim 13, wherein the maximum magnitude of the first AC voltage is different from the maximum magnitude of the second AC voltage.

23. A method as claimed in claim 13, wherein one of the following conditions is met:

the maximum magnitude of the first AC voltage is greater than the maximum level of the second AC voltage; or the maximum magnitude of the first AC voltage is lower than the maximum magnitude of the second AC voltage.

24. A method as claimed in claim 22, wherein the lighting device includes a multi-tapped ballast circuit, and wherein:

the first coupling step comprises the step of coupling the first AC power supply to provide the first AC voltage to an input terminal of the ballast circuit when the DC voltage reaches the first value; and the second coupling step comprises the step of coupling the second AC power supply to provide the second AC voltage to another input terminal of the ballast circuit when the DC voltage reaches the second value.

25. A method as claimed in claim 24, wherein:

the first coupling step comprises the step of applying the DC voltage to a triple-pole double-throw relay to control the relay to operate in a first mode in which the first AC power supply is coupled to provide the first AC voltage to the input terminal of the ballast circuit; and the second coupling step comprises the step of applying the DC voltage to the triple-pole double-throw relay to control the relay to operate in a second mode in which the second AC power supply is coupled to provide the second AC voltage to the another input terminal of the ballast circuit.

26. A circuit for use with a high intensity discharge lighting device, comprising:

a drive circuit, including a ballast circuit and an ignitor, which ignites and drives the high intensity discharge lighting device; and a relay, which operates in a first mode of operation to couple a first AC power supply to provide a first AC voltage to the drive circuit when the first AC voltage provided by the first AC power supply has a magnitude at least equal to a first magnitude such that the first AC voltage powers the drive circuit to ignite and drive the high intensity discharge lighting device, and which operates in a second mode of operation to couple a second AC power supply to provide a second AC voltage to the drive circuit when the first AC voltage provided by the first AC power supply has a magnitude less than a second magnitude which allows the high intensity discharge lighting device to extinguish, such that the second AC voltage powers the drive circuit to re-ignite and drive the high intensity discharge lighting device.

27. A method for powering a high intensity discharge lighting device, comprising the steps of:

coupling a first AC power supply to provide a first AC voltage to a drive circuit, which includes a ballast circuit and an ignitor, when the first AC voltage provided by the first AC power supply has a magnitude at least equal to a first magnitude such that the first AC voltage powers the drive circuit to ignite and drive the high intensity discharge lighting device; and coupling a second AC power supply to provide a second AC voltage to the drive circuit when the first AC voltage provided by the first AC power supply has a magnitude less than a second magnitude which permits the high intensity discharge lighting device to extinguish, such that the second AC voltage powers the drive circuit to re-ignite and drive the high intensity discharge lighting device.

* * * * *